United States Patent [19]

Cuvelier

[11] Patent Number: 4,515,609
[45] Date of Patent: May 7, 1985

[54] FLUID CLEANER DEVICE

[75] Inventor: Leon Cuvelier, Hamme-Mille, Belgium

[73] Assignee: Donaldson Company, Inc., Minneapolis, Minn.

[21] Appl. No.: 532,018

[22] Filed: Sep. 14, 1983

[51] Int. Cl.$^3$ .................. B01D 46/04; B01D 46/44
[52] U.S. Cl. ............................ 55/270; 55/287; 55/301; 55/309; 55/343; 55/350; 55/481; 55/484
[58] Field of Search ............. 55/270, 274, 301, 302, 55/304, 309, 343, 350, 481–484, 287

[56] References Cited

U.S. PATENT DOCUMENTS

| | | | |
|---|---|---|---|
| 1,914,667 | 6/1933 | Kolla | 55/274 |
| 2,019,186 | 10/1935 | Kaiser | 55/482 |
| 2,057,568 | 10/1936 | Gerard | 55/481 |
| 4,040,042 | 8/1977 | Mayer | 55/274 |
| 4,171,210 | 10/1979 | Miller | 55/481 |
| 4,197,098 | 4/1980 | Stiehl et al. | 55/350 |
| 4,246,011 | 1/1981 | Oberdorfer | 55/484 |
| 4,321,070 | 3/1982 | Bede | 55/274 |

FOREIGN PATENT DOCUMENTS 2410497 8/1979 France .................. 55/274

Primary Examiner—David L. Lacey
Attorney, Agent, or Firm—Merchant, Gould, Smith, Edell, Welter & Schmidt

[57] ABSTRACT

A fluid cleaner device to be used for retaining the dust and contaminants of a fluid, such as the combustion air for an internal combustion engine, comprises a plurality of parallel cleaning cells or units each consisting of a main filter for arresting and collecting the dust and contaminants contained in the fluid to be cleaned, and at least one respective safety filter which is able, in the event of a fissure in the main filter to retain the dust and contaminants not collected upstream by the main filter. The safety filter is a structure that when through crossed by the cleaned fluid induces only low pressure losses, but is rapidly clogged by the dust and contaminants passing through a fissure in the main filter, so that the flow of the fluid to be cleaned which escapes the main filter is rapidly stopped and diverted to other normally functioning cleaning units.

7 Claims, 4 Drawing Figures

FLUID CLEANER DEVICE

TECHNICAL FIELD

The present invention relates to a filter arrangement for fluid cleaner devices and especially air cleaners used mainly for internal combustion engines and gas turbines and comprising dust collectors or air conditioning elements which are fitted in parallel.

BACKGROUND OF THE INVENTION

Under certain conditions, when the air is heavily charged with dust and contaminants, it is extremely important to ensure absolute protection for the engine, regardless of what happens to the main filter itself.

Until now, the large filter housings have been composed of a single stage of a plurality of filter elements installed in parallel banks or modules, but these elements are installed in such a way that if one of them fails to perform to requirements, the entire protected system loses its protection.

A second stage is sometimes installed downstream from the first stage, as a back-up in case of failure of the first stage. The second stage generally consists of a costly rack, in which another plurality of cleaning elements is installed in the central plenum upstream from the filter outlet. Such a system presents various drawbacks. The second stage must incorporate a large surface area in order to minimize its pressure loss and to insure cleaning efficiency in the event of failure of the first stage, as the air velocity is generally high due to the reduced available space. A large filtration area provides a large dust capacity which increases the need for high efficiency in order to minimize, in the event of an accident, the quantity of dust ingested by the engine.

High efficiency means that during normal performance all the dust and contaminants passing the first stage are trapped by the second stage. In this situation a high retention capacity upstream from the second stage is emphasized.

In the prior art devices if one element leaks, the whole safety stage risks being contaminated and clogged. In order to detect such clogging, the differential pressure through the second stage must be monitored to signal an alarm whenever necessary. An access to the second stage is required in order to allow servicing of the cleaner device. When maintenance is conducted from the dirty air side, the cost of the second stage is very high. If the servicing of the cleaner device is carried out from the clean air side, the cost is lower but the danger of contamination of the engine is increased and loose tools, nuts or removed dust may reach the engine. Moreover, it is difficult to locate the leaking element because such often is evident only by dirt traces on metal surfaces when the main filter has a small fissure through which part of the retained dust and contaminants escape.

Generally a leak is detectable only when the pressure loss of the entire system is excessive. The turbine or engine, protected by the cleaner device, must be stopped and both the primary stage and the safety stage have to be replaced. Due to the high filtering efficiency of the second stage, its differential pressure is constantly and slowly increasing because all of the contaminants passing the first stage are picked up by it. It is difficult to observe a slow increase of differential pressure in a short time, especially when no recording is made. The leakage continues until the first stage or faulty element is replaced at the time of normal servicing of the entire cleaning system. The existing safety cleaning systems are very expensive and complicated since, as explained above, the use of a second stage filter for safety significantly increases the cost, as well as, the bulkiness of the system and more particularly, the servicing costs and the risks of operating problems are increased.

SUMMARY OF THE INVENTION

The present invention simplifies the design of safety, fluid cleaner devices and increases their reliability in the event of a fissure in a small quantity of main filter cells of the plurality of parallel cleaning units, without substantially reducing the overall performance of the cleaning device.

The invention facilitates the servicing of the cleaner device and increases safety for the turbine or engine protected by the cleaner device when one of the main filter cells has a fissure and has to be changed during normal servicing of the cleaner at the time of routine maintenance.

To accomplish the foregoing the present invention isolates the leaking area, suppressing both its effects and the leak itself and preventing it from causing any damage to the turbine or the engine, without significantly affecting the turbine or engine performance.

By means of the invention, the maintenance interval can be kept the same as that of the first stage in any type of environmental conditions, even if a leak occurs.

The fluid cleaner device of the present invention is used for retaining the dust and contaminants of a fluid, e.g. combustion air for an internal combustion engine. In a preferred embodiment the fluid cleaner device comprises a plurality of parallel cleaning units each consisting of a main filter for arresting and collecting the dust and contaminants contained in the fluid to be cleaned, and, at least one respective saftey filter that is able, in the case of a fissure in the main filter to retain the dust and contaminants collected upstream from the main filter. The safety filter is a structure which, when through crossed by the cleaned fluid, induces only low pressure losses, but is rapidly clogged by the dust and contaminants liberated through the fissure in the main filter. This is achieved by structure which quickly stops the flow of fluid that crosses the main filter, directing it instead towards the other normally functioning cleaning units or cells.

The safety filter is preferably designed in order to allow high face flow velocity when the dust and contaminants charge on the face is low.

The material forming the safety filter may have a high permeability which rapidly decreases when dust and contaminants are retained at its inlet face; it may also have a plurality of through-crossing channels of increasing transverse section such that the fine dust and contaminant particles pass through these channels without a substantial pressure drop, while bigger particles, such as those escaping from a fissure within the main filter, are stopped at the channel inlet and rapidly clog the safety filter in the event there is a fissure in the main filter.

In a commercial embodiment of the invention, the fluid cleaner device is made of a plurality of cleaning cells, each having a main filter. In the event of a fissure in the main filter through which dust and contaminants escape, the cleaned fluid issuing from the plurality of the cleaning cells through-crosses a single and common safety filter which is constructed and arranged so as to produce low pressure losses when unclogged but to retain the dust and contaminants which escape through the fissure in the main filter.

When the air cleaner device is equipped as described hereinabove and in the event of a leak occurring in the main filter of one of the cleaning cells or units, the dust and contaminants plug the safety filter, generating a differential pressure increase in the filter unit. The air flow is automatically diverted into the other parallel units which are still operating well. Progressively, the flow through the faulty unit is stopped, putting this area out of practical service and ensuring continued protection for the engine. Preferably the safety filter is designed for a high face velocity with low dust charge, so that it plugs very rapidly in the event of an accidental leak in one of the main filters of the units, while allowing the cleaned fluid to pass through without significant pressure losses during routine operation.

Furthermore, the low dust capacity increases the protection and a minimum of dirt will reach the engine in the event of an accident, even if the safety filter efficiency grade is lower. In this case, the chamber between the main filter and the safety filter may have a limited capacity which is rapidly filled by the dust and contaminants retained by the safety filter in the event of a fissure in a main filter.

According to yet another embodiment of the invention, the chamber between the main filter and the safety filter may have a considerable capacity that cannot be filled by the dust and contaminants retained by the safety filter. The considerable capacity is provided in order to allow access to the safety filter for its cleaning after the fissure in the main filter has been repaired.

According to important improvements for facilitating the maintenance of the fluid cleaner device, each safety filter is equipped with a detecting mechanism which indicates when the fluid flow crossing it is greatly reduced to a level that corresponds to the clogging of the safety filter, and/or indicates when it is covered with a layer of dust and contaminants which have escaped through the main filter and whose thickness corresponds to the clogging of the safety filter.

Any failing element of the main filter is easily removed and replaced by another element when the cleaning unit is out of service. On the other hand the safety filter is not easily removed, but it is fitted with cleaning equipment for expelling within the chamber in the area between the main filter and the safety filter the dust and contaminants that have accidentally clogged the safety filter. The expelled dust and contaminants are recoverable before or after the operation of the main filter is terminated.

Accordingly an important improvement of the invention allows a clogged cleaning unit to be reactivated without stopping the normal operation of the entire fluid cleaner device. Any failing element of the main filter is easily removed and replaced with another element when the saftey filter is clogged, with the fluid flow through the failed main filter of a unit being diverted to the other cleaning units. The safety filter is fitted with cleaning equipment which can, at the moment all the failing elements of the main filter have been replaced by other ones in good condition, expel, outside or within the chamber area between the main filter and the safety filter, at least a large part of the dust and contaminants clogging the safety filter. The fluid flow through the main filter and the safety filter is restored, or at least a major portion thereof, and the expelled dust and contaminants clogging the safety filter are collected largely on the floor of the chamber between the main filter and the safety filter.

The cleaning equipment may have a collecting mechanism for removing from the device the layer of dust and contaminants that has accidentally clogged the safety filter.

These and other objectives and advantages of the present invention will become more apparent from reading the following detailed description, along with the accompanying drawings.

DETAILED DESCRIPTION OF A PREFERRED EMBODIMENT

Figure 1:
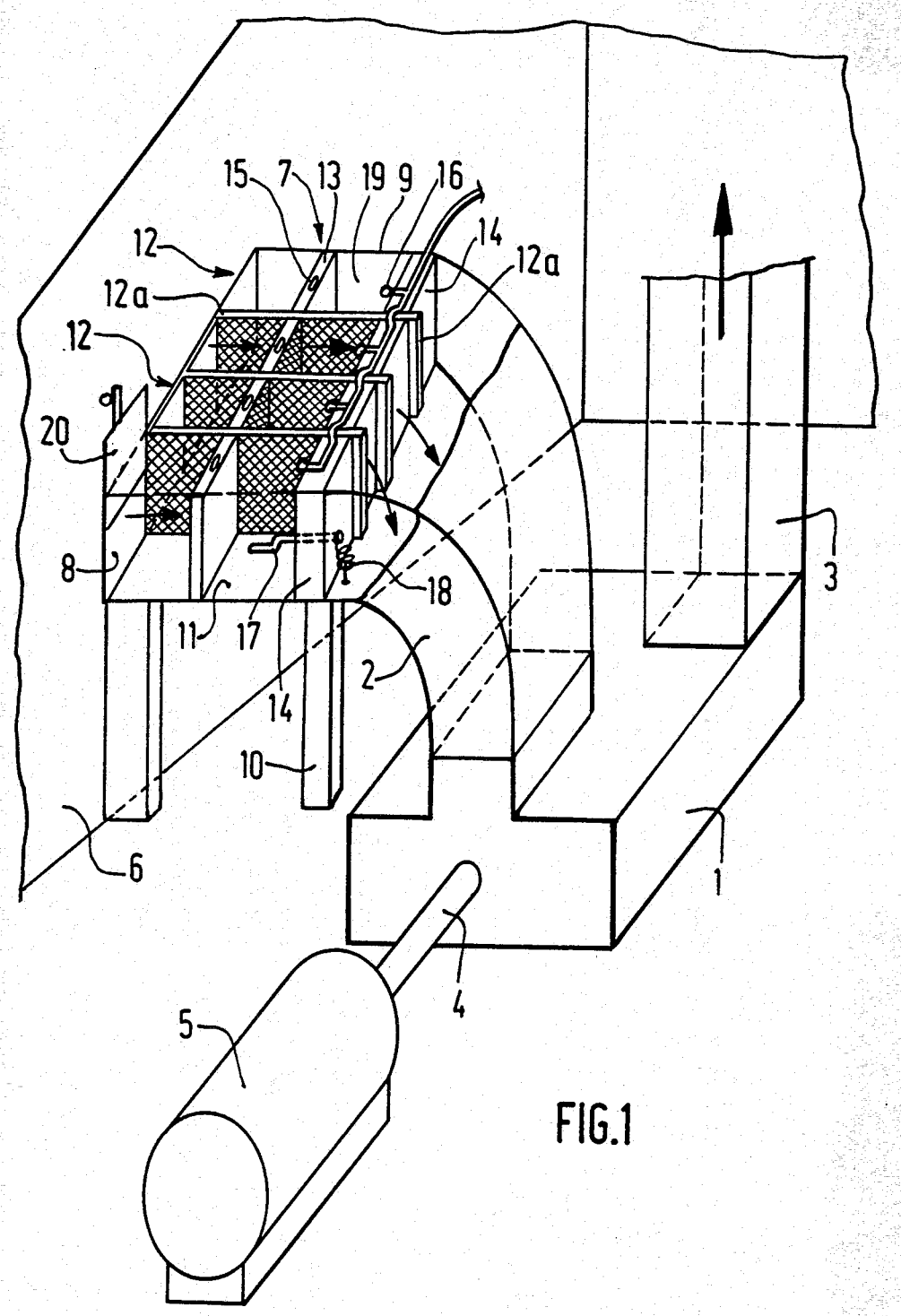
FIG. 1 is a partial diagrammatic view of an air cleaner device, constructed according to the present invention, for supplying a gas turbine with cleaned air.

The filtration system according to the invention, and as diagrammatically shown in FIG. 1, is located on the air combustion circuit of a gas turbine 1 connected to a feed pipe 2 and a waste gas stack 3. The gas turbine is mechanically connected by a shaft 4 to an electric generator 5 or other power driven device, for example, a compressor.

Combustion air is fed by an external air intake (not shown) through a wall 6 of the chamber in which are located the turbine 1, accessory devices and power driven, devices such as the electric generator 5. A filter device 7 is placed between the engine air feed pipe or air plenum 2 and a passage 8 in the wall 6 so that the wall 6 acts as a partial post or support for the housing 9 of the filter. The housing 9 in this embodiment has a sectional metallic frame which rests on supporting piles 10 and is enclosed by a casing 11. The upper section of the casing 11 has been removed in the drawing to show more clearly the various elements of the filter.

According to the invention, filter device 7 is subdivided into a plurality of parallel air cleaner units or cells 12 delimited by sealed longitudinal partitions 12a. Each cleaner unit 12 is provided with a main filter 13 and a safety filter 14. The main filters 13 are each provided with hooks 15, allowing their simple positioning and removal, for example, via a travelling crane (not shown) operated above the filter device 7.

Safety filters 14 that are not adapted to be removed rapidly are provided with cleaning equipment 16 comprising, for example, a vapor or compressed air nozzle. For certain applications that allow for the cleaning of safety filter 14 during normal operation of the installation, mechanical scraping or scratching means positioned along the safety filter upstream surface, permit the removal of dust in relatively large pieces that do not subsequently disintegrate, or re-clog the safety filter. An air flow speed detection device, such as a pitot tube 17, linked up to remote control transmission means such as a cable 18, is located in each chamber 19. Each chamber 19 is defined by main filter 13, a safety filter 14, opposing partitions 12a and the walls of the casing 11 of the filter body.

According to one of the essential characteristics of the present invention, each safety filter 14 has a structure that is rapidly clogged by any dust and contaminants which might escape into chamber 19 in the event of a rupture or fissure of the main filter 13 of a cell 12. In the absence of a deposit of dust and contaminants on safety filter 14, i.e. in the usual case of the main filter functioning perfectly and retaining the dust and contaminants contained in the combustion air, the safety filter 14 has an extremely good permeability that increases only slightly the pressure drop of the combustion air during filtration.

The main filter 13 and the safety filter 14 are shown for simplicity's sake on the drawing in the form of plates, but they can also have any other appropriate configuration such as bag filters in the form of overlapping fingers.

Various filtration materials can be used in order to obtain both high permeability of the safety filter 14 and rapid clogging properties in the event of an arrival of dust from the main filter 13. Materials that can be used, among others, include a structure comprising channels or openings that progressively decrease in diameter in the direction of the safety filter outlet.

Among the materials having the property of a high permeability for fine particles of dust and contaminants, which permeability rapidly decreases when the through-crossing air is charged with larger particles, such as those escaping through a fissure in the main filter, is a special paper for filters which is made of a mixture of natural and synthetic cellulosic fibres. Such a paper is subjected to a chemical treatment for augmenting its high permeability for the gases containing fine particles of dust. The dust and contaminants retained by the safety filter 14 lodge, first of all, in the ends of the channel inlets and thereafter rapidly block them completely. The cleaning of such clogged filters can be carried out by counter flow blowing which causes vibrations to release the dust that blocks the channels. To detect clogging of the safety filter 14, the filter surface may be tested with a mechanical or electrical detecting device or sensor.

It should be clear to one skilled in the art how the filtration installation shown on the drawing functions. The combustion air flow drawn by the turbine 1 penetrates the casing 11 of the filter device 7 and is subdivided into separate parallel flows by partitions 12a, each of which extends through an air cleaner cell 12. The main filter 13, during normal operation, retains all of the dust and contaminants (such as water droplets) that accumulate on its surface and in the housing that is located in front of the filter itself. The air cleaned by the main filter 13 thereafter passes through the respective safety filter 14 without leaving any dust thereon and with a minimum loss of pressure since the non-contaminated safety filter is highly permeable. The safety filter can be provided with chemical contaminant retention means, e.g. sulfur fumes retention means. This particular chemical contaminant retention means on the safety filter has the advantage of suppressing the risk of being inhibited by dust deposits. After passing through the safety filters 14, the various filtered air flows from the cleaner cells 12 recombine in the feed pipe or air plenum 2 of the turbine 1.

If a fissure occurs in one of the main filters constructed, for example, from a woven material or having a porous structure similar to that of paper, the dust, accumulated on the filter 13 in the proximity of the fissure and the dust in the air flows passing through the respective air cleaner cell 12 in which the filter 13 is defective, will accumulate in the safety filter 14. The safety filter 14 retains the dust but the permeable passages or pores will clog rapidly with the dust. The air flow through the failed air cleaner cell is rapidly reduced, and the air flow drawn by turbine 1 bypasses the defective cell and is instead drawn towards the other air cleaner cells which are functioning normally.

When the clogging of the safety filter 14 is indicated, either by a reduction in the air flow into the chamber 19 as indicated through the use of a Pitot tube, or by detection of a clogging layer on the external surface of the filter, the installation can be left in operation as long as one of the other air cleaner cells 12, according to the number of such cells used, is not in turn blocked. During routine servicing of turbine 1 and the filtration installation, the defective main filter 13 is changed and the safety filter 14 is unclogged, while carefully preventing deposits of dust and contaminants retained by the safety filter from escaping into the feed pipe or air plenum 2.

One method for accomplishing the unclogging of the safety filter 14 is by counter flow blowing of compressed air or steam into the filter. Another method may be scraping the deposit off the surface of the safety filter 14. The safety filter may then be replaced by a safety filter 14 in good condition. The unclogging of the safety filter 14 is facilitated by the considerable dimensions of the chamber 19 which allows the dust deposits to be collected by the opening left by the removal of the main filter 13.

According to another embodiment of the invention, when the quantities of dust normally accumulated upstream from the main filter 13 are considerable, the thickness or extent of free space in chamber 19 is reduced, so as to extend the accumulation of dust in front of the safety filter 14 in event of a rupture or fissure of the main filter 13 and to form a layer of dust and contaminants. The thickness of the accumulated dust may be checked by mechanical detecting means or by an electrical measuring of the "thickness". The knowledge about the thickness of the layer of dust and contaminants easily permit the operator of the fluid cleaner device to be informed when the safety filter 14 is considered clogged.

In certain filtration installations, the replacement of the main filter 13 of an air cleaner cell 12 is carried out during routine servicing of the installation. These installations are furnished with a shutting-off damper for each air cleaner cell 12 such as damper 20 shown on the drawing. In case of failure of one of the main filters 13, the respective safety filter 14 retains the dust and rapidly puts the air cleaner cell out of service. After detection of the failure, the damper 20 of the defective air cleaner cell 12 can be blocked off, the main filter 13 replaced and the safety filter 14 unclogged, while taking great care not to allow the dust and contaminants to escape into feed pipe 2 which is still in operation. In the case where unclogging of the safety filter 14 has to be made after recommencing operation of the main filter 13 yet, before it is swept through by a considerable air flow, the surface of the safety filter 14 may be crushed or scraped in order to remove accumulated dust and contaminants. The large pieces of dust which are removed and fall on the floor of chamber 19 may be left until the next general maintenance where they will not be disintegrated by the flow of air that passes through the chamber. The passage of the air flow is restored through the safety filter 14 without any risk of loss of dust and contaminants towards the turbine and without interruption to the loading of the main filter 13. This device overcomes the need to have an individual shutting-off system for each air cleaner cell.

Figure 2:
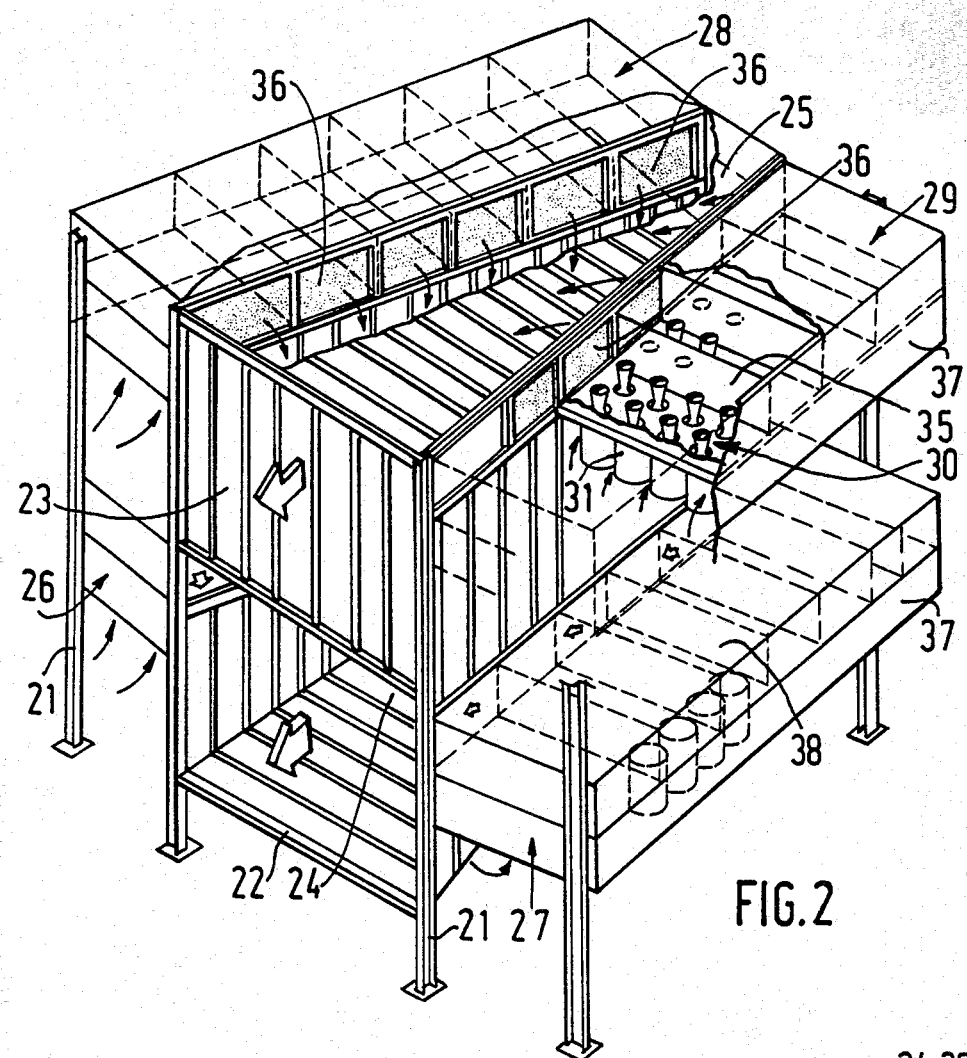
FIG. 2 is a perspective view of a second air cleaner device, constructed according to the present invention, having cleaning units made of a plurality of air filter cells connected to a common safety filter.

The filtration device shown in FIG. 2 is adapted to be installed outside on a metallic structure supported by poles 21 and to feed air through large inlet openings 22 and 23 to an element consuming cleaned air as a large mass, e.g. a gas turbine. Each inlet opening is connected in the filtration device to a collection channel of filters 24 and 25 respectively which are shaped like the trunk of a pyramid in order to take into account the increasing out-flow that penetrates within this channel to the output of the groups of the filtration assemblies 26, 27, 28, 29 which are aligned the length of each of the lateral faces of channels 24 and 25. As shown, each of the filtration assemblies 26, 27, 28 and 29 includes a plurality of parallel filtration cells or units 30.

According to the embodiment of the invention represented in FIG. 2, each filtration unit 30 is constructed of several main filtration devices 31. Each filtration device 31 has a principal surface filter 32 comprising a cylindrical sheath made of porous paper (see FIGS. 3 and 4) removably and sealingly mounted on a cylindrical support 33. The output of the principal surface filter 32 issues, for example, towards the top through a venturi 34 in the upper chamber 35 of the filtration unit 30. The upper chamber 35 serves as a tranquilization and repartition chamber which is connected to the collection channel 24 or 25 by a safety filter 36 having a generally rectangular shape. According to the invention, the safety filter 36 has a smaller surface area than that of the principal surface filters 32 of the devices 31 in the filtration unit 30. Further, the safety filter 36 is preferably made from a very porous material that does not cause any substantial supplementary pressure loss in the cleaned air at the output of devices 31 but which, inevitably clogs very rapidly when the surface filter 32 of one or several of these devices 31 is torn or pierced while the filtration installation is operating.

The filtration device represented in FIG. 2 allows, for example, expiration of the air extremely charged with dust like that subjected to a sand storm without risking the clogging of the filters and without having to interrupt the installation to change the surface filter 32 of a filtration device 31. The filtration assembly 28 is represented with its cover removed in the zone of safety filters 36 whereas the filtration assembly 29, shown in the various cut-away views, clearly illustrates the construction and arrangement of a filtration unit 30. The base of the filtration devices 31 is hidden by an edge 37. This edge 37 forces the air extracted in the filter 32 to penetrate from the bottom to the top in the devices 31. The filter may be automatically unclogged by blowing compressed air towards the surface counter-current to the induction of the air to be cleaned, so that the dust deposits of the filtration assemblies 29 fall back into the atmosphere and on the roof 38 and the dust deposits of the filtration assembly 27 fall back onto the ground supporting the installation.

During normal operation, the outflow of all the various units 30 is generally parallel along their respective connection channels 24 and 25. If the surface filter 32 of a device 31 is torn, the dust and contaminants that cross through the fissure are deposited on the safety filter 36 which rapidly clogs, especially if the existing deposits at the surface of the surface filter 32 escape through the fissure.

When detection by the above-mentioned means, e.g. a Pitot tube or surface detector, is made in a filtration unit 30 of a critical clogging of the safety filter 36 of the filtration unit 30, it is possible to proceed with an exchange of a defective surface filter 32 without risking pollution of the cleaned air in the collection channel 24 or 25. This is so because the dust and other pollutants that would in any event be halted by the safety filter 36, fall back generally on the floor of the upper chamber 35 of the unit 30 since the air outflow through-crossing the clogged safety filter 36 is very low. After repairing the defective surface filter 32 or filters, it is possible in certain fluid cleaning installations according to the invention, to proceed with the replacement or substitution of the clogged safety filter 36 while the filtration installation remains in operation. To illustrate this possibility, FIG. 3 represents schematically a cut device 31 and a safety filter 36 that can be introduced by lateral sliding in the guiding mounts 39 and support 40 or indeed can be applied to a bearing edge from a collection channel 24 or 25 after depositing a carriage plate 41.

Figure 3:
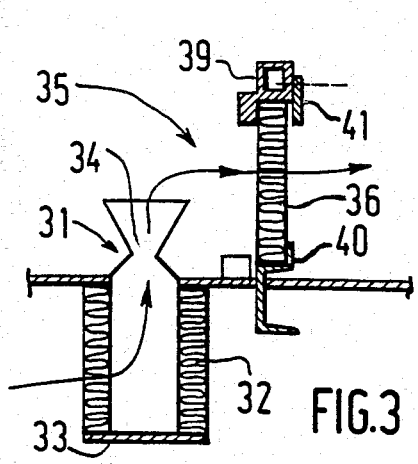
FIGS. 3 and 4 are schematic cross-sectional views of a primary air filter cell and two embodiments of the fitting of the safety filter of the air cleaner of FIG. 2.
Figure 4:
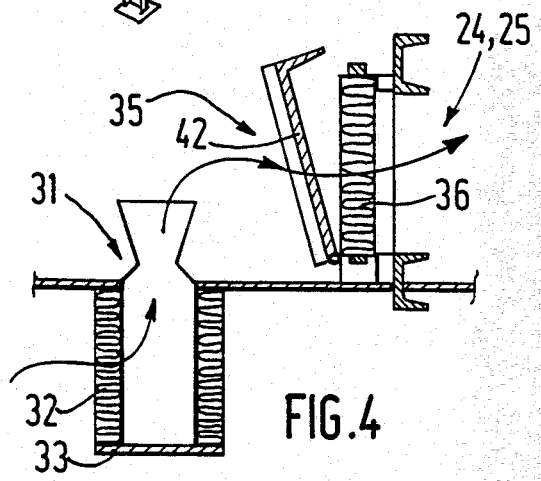

FIG. 4 schematically represents, along a cross-section like that shown in FIG. 3, a solution whereby safety filter 36 can be extracted towards the top by using a crane after rotating a rotative carriage or sealing support 42 away from the filter. This latter device avoids having to intervene in the collection channel 24 or 25 in order to change safety filter 36, thus limiting the risks of pollution in the air feeding channels downstream of the safety filter.

The present invention is not limited to the embodiments described and shown but covers all modifications and combinations thereof, without departing from the scope and spirit of said invention.

What is claimed is:

1. A fluid cleaner device, comprising:
   a housing including partitions therein defining a plurality of separate cleaning cells arranged in parallel between an inlet and an outlet;
   a main filter disposed in each cell of said housing adjacent the inlet for filtration of dust and contaminants from the fluid to be cleaned; and,
   a safety filter disposed in each cell of said housing in spaced relationship with the respective main filter and adjacent the outlet, said safety filter being constructed so as to have the characteristics of relatively high permeability and high face flow velocity with a low charge of dust and contaminants thereon so that cleaned fluid from said main filter is allowed to pass through without significant pressure losses during routine operations, but so that, in the event of a fissure in said main filter, said safety filter rapidly clogs and thus isolates the respective cleaning cell from the other cleaning cells in said housing.

2. The fluid cleaner device of claim 1, wherein each main filter is positioned and arranged so as to be removable.

3. The fluid cleaner device of claim 1, further including:
   means positioned and arranged with respect to the safety filter for detecting a reduction in fluid flow through the associated cleaning cell of said housing corresponding to clogging of said safety filter.

4. The fluid cleaner device of claim 1, wherein each safety filter and corresponding main filter are positioned so as to define a chamber therebetween within the associated cleaning cell, and further including:
means positioned and arranged to expel within the chamber dust and contaminants collected on the safety filter to restore fluid flow through the respective cleaning cell of said housing.

5. A fluid cleaner device, which comprises:
a housing including partitions therein defining a plurality of separate cleaning cells arranged in parallel between an inlet and an outlet;
a main filter disposed in each cell of said housing adjacent the inlet for effecting filtration of dust and contaminants from the fluid to be cleaned;
a safety filter disposed in each cell of said housing in spaced relationship with the respective main filter and adjacent the outlet, said safety filter constructed so as to have the characteristics of relatively high permeability and high face flow velocity with a low charge of dust and contaminants thereon so that cleaned fluid from said main filter is allowed to pass through without significant pressure losses during routine operations, but so that, in the event of a fissure in said main filter, said safety filter rapidly clogs and thus isolates the respective cleaning cell from the other cleaning cells in said housing;
means positioned and arranged with respect to each safety filter for detecting a reduction in fluid flow through the associated cleaning cell of said housing corresponding to clogging of said safety filter; and,
means positioned and arranged to expel between the main and safety filters of each cell the dust and contaminants collected on the safety filter to restore fluid flow through the respective cleaning cell of said housing.

6. The fluid cleaner device of claim 5, further including:
damper means disposed in each cleaning cell between the respective main filter and inlet for selectively shutting off fluid flow through the cell.

7. A fluid cleaner device, which comprises:
a diverging collection channel having an outlet at one end and inlets along opposite sides thereof;
means for supporting said collection channel;
a pair of housings mounted over the inlets on opposite sides of said collection channel;
each housing including partitions therein defining a plurality of separate cleaning cells arranged in parallel between an open inlet and an outlet connected to the associated inlet of said collection channel;
main filter means mounted in each cell of said housing adjacent the cell inlet for effecting filtration of dust and contaminants from the fluid to be cleaned; and
safety filter means mounted in each cell in spaced relationship with the respective main filter means and adjacent the cell outlet;
said safety filter means constructed so as to have the characteristics of relatively high permeability and high face flow velocity with a low charge of dust and contaminants thereon so that cleaned fluid from said main filter means is allowed to pass through without significant pressure losses during routine operations, but so that, in the event of a fissure in said main filter means, said safety filter means rapidly clogs and thus isolates the respective cleaning cell from the other cleaning cells in said housing.

* * * * *